United States Patent [19]

Hockett

[11] Patent Number: 4,666,188
[45] Date of Patent: May 19, 1987

[54] COUPLING APPARATUS

[76] Inventor: Wayne B. Hockett, 5103 S. Westshore, Tampa, Fla. 33611

[21] Appl. No.: 766,836

[22] Filed: Aug. 16, 1985

Related U.S. Application Data

[63] Continuation-in-part of Ser. No. 627,780, Jul. 5, 1984.

[51] Int. Cl.$^4$ .............................................. F16L 37/24
[52] U.S. Cl. ........................................ 285/38; 285/92; 285/294; 285/351; 285/360; 285/423; 285/915
[58] Field of Search .............. 285/294, 297, 423, 915, 285/92, 351, 360, 38

[56] References Cited

U.S. PATENT DOCUMENTS

| 339,036 | 3/1886 | Wilbur | 285/294 |
|---|---|---|---|
| 2,876,154 | 3/1959 | Usab | 285/915 |
| 3,108,826 | 10/1963 | Black | 285/915 X |
| 3,876,234 | 4/1975 | Harms | 285/423 X |
| 4,143,892 | 3/1979 | Murphy et al. | 285/297 |
| 4,281,859 | 8/1981 | Davies | 285/351 X |
| 4,386,796 | 6/1983 | Lyall et al. | 285/915 |

FOREIGN PATENT DOCUMENTS 2112892 7/1983 United Kingdom .................. 285/92

*Primary Examiner*—Dave W. Arola
*Attorney, Agent, or Firm*—Frijouf, Rust & Pyle

[57] ABSTRACT

A coupling apparatus and method is disclosed for coupling a first and a second hose to enable the flow of fluid therethrough upon the application of fluid pressure comprising a first coupling member having a first internal bore connected to the first hose. A second coupling member having a second internal bore is connected to the second hose. A first and second major thread is disposed on the first and second coupling member, respectively. The first coupling member is insertable into the second coupling member with the first major thread threadably engaging the second major thread. The first and second coupling member being constructed of a resilient and deformable material for enabling radial expansion of the first and second coupling member upon the application of the fluid pressure. A restraining member is secured to the second coupling member for inhibiting radial expansion of the second coupling member to enable radial expansion of the first coupling member within the second coupling member to create a fluid tight seal therebetween. The first and second coupling members may be constructed of a resilient and deformable polymeric material making the coupling apparatus suitable for use with high pressure abrasive systems such as sand blasting or the like.

23 Claims, 8 Drawing Figures

COUPLING APPARATUS

CROSS REFERENCE TO RELATED APPLICATIONS

This is a continuation-in-part of application Ser. No. 627,780 filed July 5, 1984. All matters set forth in application Ser. No. 627,780 is hereby incorporated by reference.

BACKGROUND OF THE INVENTION

Various types of fluid coupling devices have been proposed in the prior art for coupling hoses for transmitting a wide variety of fluids such as liquids and/or solids. The coupling devices have been utilized for coupling hydraulic fluids, liquids and semi-solids and the like. Among the most difficult materials to transmit through a fluid coupling device are high pressure fluids such as high pressure liquids and/or high pressure gases with the solid particulate material transmitted therewith. In the field of sand blasting, wet blasting and painting, the difficulty encountered with the fluid couplings are particularly troublesome due to the abrasive quality of the sand blasting or wet blasting materials.

In a typical sand blasting operation, a high pressure air compressor forces particulate abrasive material in the form of selected sand particles through a hose to a nozzle whereat the fluid will project the abrasive particles to a surface for cleaning and removing undesirable surface material. The hose interconnecting the high pressure air compressor and the nozzle in general will be composed of a plurality of hose sections interconnected by hose couplings. In the past, the hose couplings were typically formed from a metallic material and interconnected the abutting hose sections to form a tight line between the high pressure air compressor and the sand blasting nozzle. Since the abrasive material was transmitted through the hose and couplings at a high rate, it was common for the hose to be abraded and fractured at a point particularly where the hose would undergo a bend or a small radius. In addition, the high velocity abrasive material would likewise abrade the coupling interconnecting the hose sections, thereby deteriorating the fluid tight seals in the coupling member. The suction of the fluid tight seals, typically O-rings in the coupling members, would cause high pressure leaks which further aggravated and deteriorated the leak in the coupling member resulting in failure of the coupling member. Accordingly, the coupling member would have to be replaced by a new coupling. It should be appreciated that a typical sand blasting operation incorporates a multitude of coupling members between the air compressor and the nozzle. The replacement of the coupling members caused a substantial downtime for the sand blasting operation, resulting in enormous expense in some situations, for example a ship located in a dry dock. The dry dock fees of large ships are very substantial and the failure of a low cost coupling member resulted in a very substantial loss in the overall cost of the sand blasting operation.

In my prior patent application Ser. No. 627,780, filed July 5, 1984 and entitled "A Pipe Coupling," I disclosed a novel pipe coupling wherein the end of a first hose was abutted against an end of a second hose to provide a hose to hose coupling and to eliminate any metallic material interposed between the first and second hoses. This invention eliminated contact of the abrasive material with any metallic or coupling material of the coupling members.

It is a primary object of the present invention to improve upon my prior invention as set forth in application Ser. No. 627,780, filed July 5, 1984 and to provide a superior coupling member for use with high pressure fluids and/or liquid and specifically suitable for sand blasting or wet blasting operations.

Another object of the present invention is to provide a coupling apparatus for coupling a first and a second hose comprising a first and a second coupling member having first and second major thread means enabling the first coupling member to be threadably engaged with the second threaded member.

Another object of the present invention is to provide a coupling apparatus for coupling a first and a second hose wherein the first and second coupling members are constructed of a resilient and deformable material for enabling radial expansion of the first and second coupling members upon the application of fluid pressure in combination with means for inhibiting the radial expansion of the second coupling member, whereby the radial expansion of the first coupling member within the second coupling member creates a fluid tight seal therebetween.

Another object of the present invention is to provide a coupling apparatus for coupling a first and a second hose including first locking ring engaging means and second locking ring engaging means disposed respectively on the first and second coupling members for receiving a locking ring means cooperating with the first and second locking ring engaging means to releasably inhibit relative rotation between the first and second coupling members.

Another object of the present invention is to provide a coupling apparatus for coupling a first and a second hose wherein the first and second coupling members include first and a second internal minor thread means for cooperating with a flowable adhesive which is cured between the voids located between the first and second coupling members and the first and second hoses thereby creating first and second adhesive threads bonded to the first and second hoses for threadably engaging the first and second internal minor thread means.

Another object of the present invention is to provide a coupling apparatus for coupling a first and a second hose, including a first and a third plurality of through aperture disposed in the first coupling member for enabling insertion of the flowable adhesive for bonding to the first hose for creating structural projections which extend through the first and third through aperture.

Another object of the present invention is to provide a coupling apparatus for coupling a first and a second hose wherein the first and second major thread means have an integral number of turns for enabling the insertion of a first hose section between a second and third hose section while maintaining the preferred orientation of the first, second and thrid hose sections.

Another object of the present invention is to provide a coupling apparatus for coupling a first and a second hose which enables a hose to hose coupling wherein the first and second coupling members are not exposed to the material internal the hose.

Another object of the present invention is to provide a coupling apparatus for coupling a first and a second hose wherein the first and second coupling members are constructed of a low cost polymeric material.

Another object of the present invention is to provide a coupling apparatus for coupling a first and a second hose which is low cost, reliable, and enables the easy replacement of the coupling member on a hose.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention within the scope of the invention. Accordingly, other objects and a fuller understanding of the invention may be had by referring to the summary of the invention may be had by referring to the summary of the invention and the detailed description describing the preferred embodiment in addition to the scope of the invention defined by the claims taken in conjunction with the accompanying drawings.

SUMMARY OF THE INVENTION

The present invention is defined by the appended claims with the specific embodiment shown in the attached drawings. For the purpose of summarizing the invention, the invention relates to an improved coupling for coupling a first and a second hose to enable the flow of fluid therethrough upon the application of fluid pressure. The invention comprises a first coupling member and a second coupling member having a first and a second internal bore, respectively and means connecting the first and second coupling members to the first and to the second hose, respectively. The first and the second coupling members having a first and a second major thread means disposed on the first and second coupling member, respectively. The first coupling member is inserted into the second coupling member with the first major thread means threadably engaging the second major thread means. The first and second coupling member are constructed of a resilient and deformable material for enabling radial expansion of the first and second coupling member upon the application of the fluid pressure. The second coupling member includes means secured to the second coupling member for inhibiting radial expansion of the second coupling member to enable radial expansion of the first coupling member within the second coupling member, thus creating a fluid tight seal therebetween.

In a more specific embodiment of the invention, the first and second coupling member have a first and a second end with the first hose being located on the first end of the first coupling member. The first major thread means are disposed on the second end of the first coupling member. The second hose is located on the first end of the second coupling member with the second major thread means being disposed on the second end of the second coupling member.

The first and second coupling members have a first locking ring engaging means and second locking ring engaging means disposed on the first and the second coupling members, respectively. A locking ring means cooperates with the first and the second locking ring engaging means to releasably inhibit relative rotation of the first and second coupling members.

The first coupling member includes first internal minor thread means extending into the first internal bore and located proximate the first end of the first coupling member for connecting the first coupling member to the first hose. The second coupling member includes second internal minor thread means extending into the second internal bore and located proximate the first end of the second coupling member for connecting the second coupling member to the second hose.

A first and a third through aperture are disposed proximate the first end and the first major thread means of the first coupling member, respectively. A second and a fourth through aperture disposed proximate the first end of the second coupling member and disposed proximate the second internal minor thread means, respectively. The third and fourth through aperture providing means for inserting a flowable adhesive into the first and second through apertures for bonding the flowable adhesive to the first and the second hoses.

The inserted flowable adhesive cures within the first and second plurality of through apertures and bonds to the first and the second hoses thereby creating structural projections bonded to the first and the second hose. The structural projections extend through the first and second plurality of through apertures of the first and second coupling members, respectively.

The flowable adhesive also bonds to the first and the second hoses and occupies voids located between the first and second coupling members and the first and the second hoses thereby creating first and second adhesive thread means for threadably engaging the first and second internal minor thread means, respectively.

The first and second hose extends into the first and second member enabling an end of the first hose to abut against an end of the second hose for creating a first hose to second hose coupling to prevent the flow of fluid from abrading the first and the second coupling members.

Preferably, the first and the second coupling members are constructed of a polymeric material.

The invention is also incorporated into the method of attaching a coupling member to an end of a hose. The method includes firstly, inserting an end of the hose into an internal bore at the first end of said coupling member. Secondly, inserting flowable adhesive into the third through aperture enabling said adhesive to flow through the third through aperture to occupy all voids along adjacent internal minor thread means and between the hose and the internal bore and to flow out of the first plurality of through apertures. Thirdly, curing the adhesive to bond to the hose for forming structural projections bonded to the hose to extend through the first and third pluralities of through apertures and for forming adhesive threads bonded to the hose and threadably engaged with the internal minor thread means.

More particularly, the step of attaching the coupling member to the end of the hose includes inserting an end of the hose into an internal bore and sealing the end of the hose to the internal bore for directing the flow of the adhesive from the third through aperture to the first plurality of through apertures. The step of inserting the flowable adhesive into the third through aperture includes forcing the flowable adhesive under pressure into the third through aperture.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DISCUSSION

Figure 1:
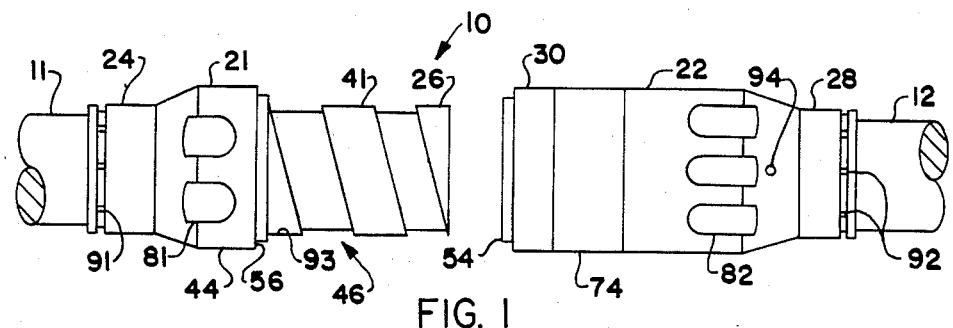
FIG. 1 is a side elevational view of a coupling apparatus in an uncoupled position.

FIG. 1 is a side elevational view of a coupling apparatus 10 for coupling a first and a second hose 11 and 12 to enable the flow of fluid therethrough upon the application of fluid pressure. The coupling apparatus 10 is suitable for use with liquids, gases and compositions thereof wherein the liquid or gases transmit liquid or solid particles therein. The coupling apparatus 10 comprises the first coupling member 21 and a second coupling member 22 with the first coupling member 21 having a first end 24 and a second end 26. The second coupling member 22 includes a first end 28 and a second end 30. A first internal bore 31 shown more fully in FIG. 2 extends between the first end 24 and the second end 26 whereas a second internal bore 32 extends between the first end 28 and the second end 30 of the second coupling member 22. The first hose 11 is inserted into the first end 24 of the first coupling member 21 and is secured thereto by first minor thread means 34 disposed within the first internal bore 31 in combination with an adhesive 36 shown in FIG. 4 as will be explained in more detail hereinafter. In a similar manner, the second hose 12 is inserted through the first end 28 of the second coupling member 22 and is secured thereto by second internal minor thread means 38 in combination with an adhesive 40 as will be also described in greater detail hereinafter.

Figure 2:
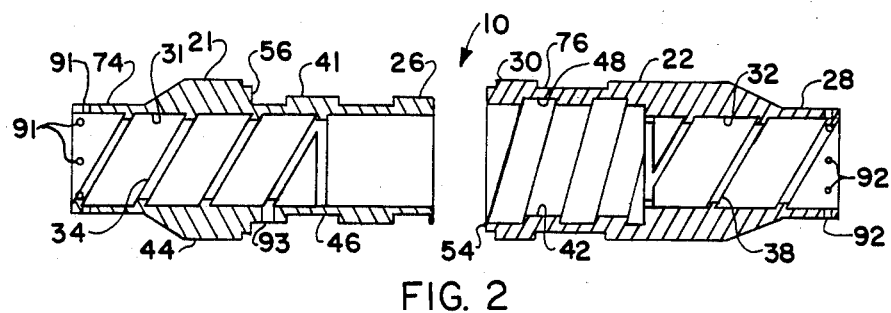
FIG. 2 is a side sectional view of the coupling apparatus of FIG. 1 with the hoses being removed.

As is can be clearly shown from the sectional view of FIG. 2, the first coupling member 21 includes first major thread means 41 whereas the second coupling member includes second major thread means 42 which enables a threadable engagement between the first and second coupling members. A second end 26 of the first coupling member 21 comprises a boss 44 defining an undercut region 46 which undercut region 46 is received within a third internal bore 48 disposed on the second end 30 of the second coupling member 22. The first major thread means 41 is disposed on the undercut portion 46 whereas the second major thread means is defined by the internal bore 48.

Figure 3:
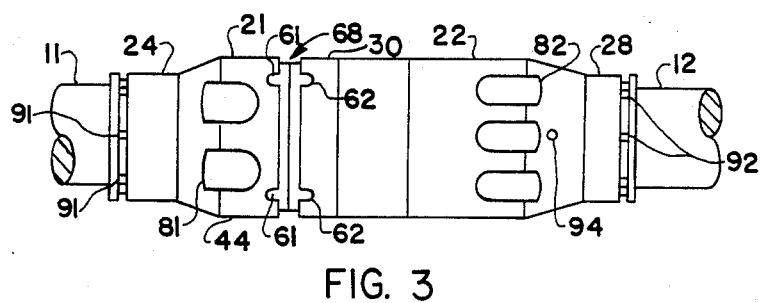
FIG. 3 is a side elevational view of the coupling apparatus of FIG. 1 in the coupled position.
Figure 4:
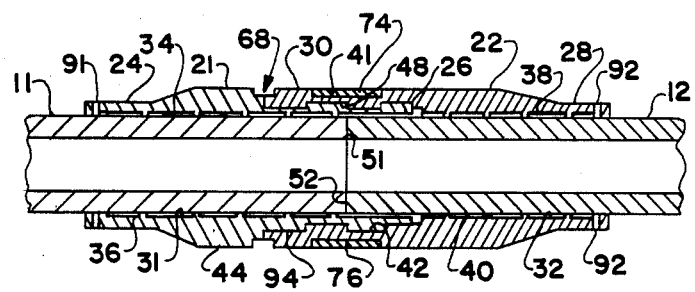
FIG. 4 is a side sectional view of the coupling apparatus of FIG. 3.

FIG. 3 is an elevational view of the coupling apparatus 10 being threadably engaged with the first major thread means engaging the second major thread means FIG. 4 is a side sectional view of the coupling of FIG. 3 which illustrates a first end 51 of the first hose 11 abutting an end 52 of the second hose thereby creating a hose-to-hose coupling and thus eliminating direct contact of the first and second coupling members 21 and 22 from the material internal the first and second hoses 11 and 12.

Figure 5:
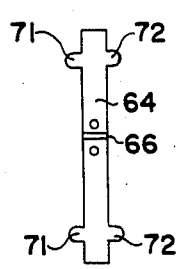
FIG. 5 is an elevated view of a locking ring for use with the apparatus shown in FIGS. 1–4.
Figure 6:
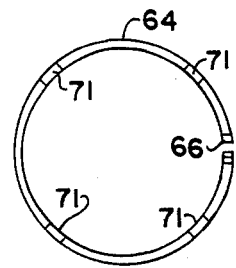
FIG. 6 is a side elevational view of the locking ring of FIG. 5.

The first hose 11 and the second hose 12 are located within the first and second coupling members 21 and 22 such that the first end 51 of the first hose abuts the end 52 of the second hose when the first major thread means 41 fully engages the second major thread means 42 and a terminal shoulder 54 of the second coupling member 22 engages a shoulder 56 defined by the boss 44 of the first coupling member. Concomitantly therewith, a first locking ring engaging means 61 is aligned with second locking ring engaging means 62 as shown in FIG. 3 for receiving therein a locking ring 64 shown in FIGS. 5 and 6. The locking ring 64 is preferably a resilient metallic ring having a split 66 enabling the ring to be opened and disposed about a recess 66 defined by first and second coupling members 21 and 22 as shown in FIGS. 3 and 4. When the locking ring is disposed within the recess 68, projections 71 and 72 on the locking ring 64 are received by the locking ring engaging ring engaging means 61 and 62 respectively. The locking ring engaging ring engaging means 61 and 62 are shown as recesses to receive the projection 71 and 72 to thereby prevent relative rotation between the first and second coupling members 21 and 22.

The second coupling member 22 includes a restraining metallic band 74 which is received within a annular recess 76 for inhibiting radial expansion of the second coupling member. The restraining means 74 is preferably a metallic band which may be located within the annual recess 76 and fastened together or in the alternative may be heat shrunk into the annular recess 74 as should be well known to those skilled in the art.

The first coupling member is preferably made of a resilient and deformable material such as a polymeric material which radially expands upon the application of fluid pressure within the first and second hoses 11 and 12. The expansion of the first coupling member 21 is applied against the third bore 48 of the second coupling member 22. Since the restraining means 74 inhibits the radial expansion of the second coupling member, the first major threads are sealed against the second major threads resulting in a fluid tight seal therebetween. Additionally, as can be clearly seen in FIG. 4, the restraining band 74 is disposed intermediate the abutment of the end 51 of hose 11 and the end 52 of hose 12. Accordingly, the restraining means 74 adds mechanical strength at the intersection of the first and second hoses in addition to enhancing the seal between the first and second threads by allowing radial expansion of the first coupling member and inhibiting radial expansion of the second coupling member.

The first and second coupling members 21 and 22 are provided with first and second grasping members 81 and 82 shown as indentations for facilitating relative rotation between the first and second coupling members 21 and 22.

The first coupling member 21 includes a first plurality of through apertures 91 whereas the second coupling member 22 comprises a second plurality of through apertures 92. In addition, the first coupling member includes a third through aperture 93 whereas the second coupling member includes a fourth through aperture 94. The third and fourth though apertures enable the introduction of the flowable adhesive as will be described in greater detail with reference to the method making the coupling with reference to FIG. 7.

Figure 7:
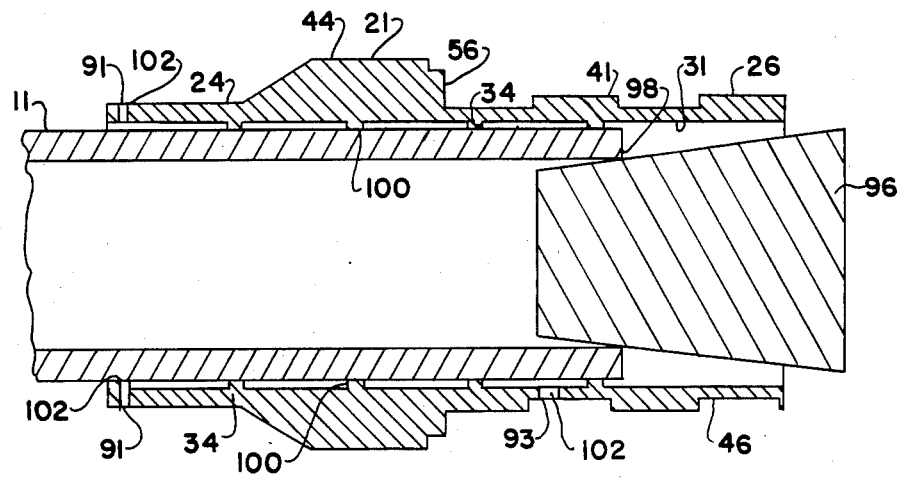
FIG. 7 is an enlarged side sectional view illustrating the method of securing a hose to the coupling apparatus.

FIG. 7 is a side sectional view of the first coupling member illustrating the method of forming the coupling apparatus. The end 51 of the first hose is inserted into the internal bore 31 of the first coupling member to be disposed in a position appropriate to form the end-to-end seal as shown in FIG. 4. Thereafter, an expansion plug 96 is inserted within the tube approximate end 51 to provide a radial seal at the outer edge 98 of the hose 11. Thereafter, a flowable adhesive is forced under pressure into the third aperture 93 to propagate and fill all voids between the hose 11 and the internal bore 31. The flowable adhesive fills all voids between the helical first internal minor threads 34 thus creating adhesive threads upon the adhesive bonding to the hose 11. The adhesive threads 100 matingly engage with the first internal minor threads 34 to threadably engage hose 11 to the first coupling 21. It should be appreciated that the flowable adhesive bonds only to the hose 11 but does not form a bond with the polymeric material of the first coupling member 22. Additionally, the flowable adhesive flows out of the plurality of first apertures 91 to form structural projections 102. The formations of structural projections 102 insures that all voids are filled between the hose 11 and the internal bore 31. In addition, the structural projections 102 prevent rotation of hose 11 relative to the first coupling member 21. A similar structural projection is also formed in the third aperture 93. Upon curing of the adhesive material, the hose 11 is mechanically bonded to the first coupling member through a mechanical helical thread and the structural projections. It should be appreciated that the adhesive exactly duplicates the first internal minor threads to provide a strong and fluid tight seal therebetween. However, if it is desired to remove the first coupling member 21 from the first hose 11, the first coupling member can be rotated relative to the first hose through the use of a mechanical advantage tool thereby shearing off the structural projections 102 and allowing the adhesive threads 100 to be disengaged from the first minor threads 34. Accordingly, the present method and apparatus provides a simple and low cost means for creating and repairing fluid tight couplings between the coupling members and furthermore, since the adhesive material does not adhere to the first coupling member, the coupling member may be reused if the hose is deemed to be defective or deteriorated to a point beyond safe use.

Figure 8:
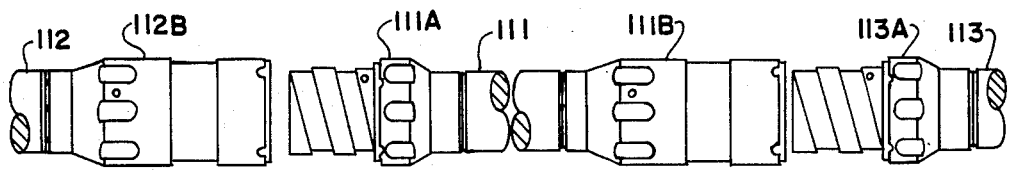
FIG. 8 is a side elevational view of a plurality of hose sections.

FIG. 8 is a side elevational view of a plurality of the coupling apparatuses shown in FIGS. 1-7 for coupling a first hose section 111 between a second and third hose a section 112 and 113. The first hose section 111 has a first coupling member 111A and a second coupling member 111B. The second hose section 112 has a second coupling member 112B and a first coupling member (not shown) in a manner similar to the third hose section 113 having a first coupling member 113A. The first and second coupling members shown in FIG. 8 are established to have an integral number of helical turns between a noncoupled position and a coupled position. For example, the first coupling member 111A cooperating with the second coupling member 112B may have two helical turns between a noncoupled and coupled position. In a similar manner, the first coupling member 113A and the second coupling member 111B may have two helical turn between a noncoupled position and a coupled position. The use of an integral helical number of turns enables the first hose section 111 in a region proximate the first coupling member 111A to be rotated one helical turn into the paper as shown by the arrow concomitantly with the second hose section 112 in a region proximate the second member coupling 112B to be rotated one helical turn in a direction out of the paper as shown by the arrow to allow initial engagement between the first and second coupling members 111A and 112B. The first and second coupling member may then be counter-rotated two helical turns to allow complete engagement between the first and second coupling members 111A and 112B. In a similar manner, the third hose section 113 in a region proximate the first coupling member 113A may be rotated one helical turn into the paper as shown by the arrow concomitantly with the first hose section 111 in a region proximate the second member coupling 111B to be rotated one helical turn in a direction out of the paper as shown by the arrow to allow initial engagement between the first and second coupling members 111B and 113A. The first and second coupling members 111B and 113A may then be counter-rotated two helical turns to allow complete engagement between the first and second coupling members 111B and 113A.

This use of an integral number of helical turns in the first and second coupling members enables an operator to interpose a first hose 111 section between a second and a third hose sections 112 and 113 without disturbing the natural or preferred orientation of the hose sections. As heretofore stated, a substantial bending of a hose section or a kink caused by tension in the hose due to an unequal number of turns will cause stress in the hose thereby aiding to the abrasion in the bent or tensioned area of the hose. The present invention enables a hose section to be inserted or removed without disturbing the preferred orientation of the hose thus eliminating undesirable wear of the hose.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A coupling apparatus for coupling a first and a second hose to enable the flow of fluid therethrough upon the application of fluid pressure, comprising in combination:

first coupling member having a first internal bore;

means connecting the first hose internal said first coupling member;

a second coupling member having a second internal bore;

means connecting the second hose internal said second coupling member;

first and second major thread means disposed on said first and second coupling member, respectively;

said first coupling member being insertable into said second coupling member with said first major thread means threadably engaging said second major thread means whereby in use the first and second hose form an end-to-end seal internal the coupling when coupling together said first coupling member and said second coupling member, respectively;

said first and second coupling member being constructed of a resilient and deformable material for enabling radial expansion of said first and second member upon the application of the fluid pressure; and means secured to said second coupling member for inhibiting radial expansion of said second coupling member to enable radial expansion of said first coupling member within said second coupling member to create a fluid tight seal therebetween.

2. A coupling apparatus as set forth in claim 1, wherein said first and second coupling member have a first and a second end;

said means connecting said first coupling member to the first hose being located on said first end of said first coupling member;

said first major thread means being disposed on said second end of said first coupling member;

said means connecting said second coupling member to the second hose being located on said first end of said second coupling member; and said second major thread means being disposed on said second end of said second coupling member.

3. A coupling apparatus as set forth in claim 2, including first locking ring engaging means and second locking ring engaging means disposed on said first and said second coupling members, respectively;

said first locking ring engaging means located proximate to said first end of said first coupling member;

said second locking ring engaging means located proximate to said second end of said second coupling member; and locking ring means cooperating with said first and said second locking ring engaging means to releasably inhibit relative rotation of said first and second coupling members.

4. A coupling apparatus as set forth in claim 3, wherein said means connecting said first coupling member to the first hose includes a first internal minor thread means extending into said first internal bore and located proximate said first end of said first coupling member for connecting said first coupling member to the first hose; and said means connecting said second coupling member to the second hose includes a second internal minor thread means extending into said second internal bore and located proximate said first end of said second coupling member for connecting said second coupling member to the second hose.

5. A coupling apparatus as set forth in claim 4, wherein said means connecting said first coupling member to the first hose includes a first plurality of through apertures and a third aperture, said first plurality of through apertures disposed proximate said first end of said first coupling member and said third through aperture disposed on said first major thread means of said first coupling member;

said means connecting said second coupling member to the second hose includes a second plurality of through apertures and a fourth through apertures, said second plurality of through apertures disposed proximate said first end of said second coupling member and said fourth through aperture disposed proximate said second internal minor thread means;

said third and fourth through aperture providing means for inserting a flowable adhesive between said hoses and coupling members and into said first and second plurality of through apertures for bonding said flowable adhesive to the first and the second hoses.

6. A coupling apparatus as set forth in claim 5, wherein said inserted flowable adhesive cures within said first and second plurality of through apertures and bonds to the first and the second hoses thereby creating structural projections bonded to the first and the second hose; and said structural projections extending through said first and second plurality of through apertures of said first and second coupling members.

7. A coupling apparatus as set forth in claim 6, wherein said flowable adhesive bonds to the first and the second hoses and occupies voids located between the first and second coupling members and the first and the second hoses thereby creating first and second adhesive thread means for threadably engaging said first and second internal minor thread means, respectively.

8. A coupling apparatus as set forth in claim 1, wherein said second end of said first coupling member comprises an undercut portion disposed on said second end of said first coupling member; and said first major thread means being located on said undercut portion of said first coupling member.

9. A coupling apparatus as set forth in claim 8, wherein said second end of said second coupling member includes a third internal bore disposed on said second end of said second coupling member;

said second major thread means being located on said third internal bore; and said third internal bore of said second coupling member being established to receive said undercut portion of said first coupling member therein with said first major thread means threadably engaging said second major thread means.

10. A coupling apparatus as set forth in claim 9, wherein the first hose extends into said first coupling member proximate to said undercut portion of said first coupling member;

the second hose extending into said second coupling member proximate said second major thread means of said second coupling member enabling an end of the first hose to abut against an end of the second hose for forming said end-to-end seal to prevent the flow of fluid from abrading said first and said second coupling members.

11. A coupling apparatus as set forth in claim 1, having first grasp means located on said first coupling member and second grasp means located on said second coupling member for facilitating relative rotation between said first and second major thread means of said first and said second coupling members.

12. A coupling apparatus as set forth in claim 1, wherein said first and said second coupling means are constructed of a polymeric material.

13. A coupling apparatus for coupling a first hose section between a second and a third hose section wherein the second and third hose sections have a preferred orientation, comprising in combination:
   a first and a second coupling member secured to opposed ends of each of said first, second and third hose sections;
   first and second major thread means disposed on said first and second coupling members, respectively;
   said first major thread means being engageable with said second major thread means with said first and second major thread means having an integral number of helical turns between a non-coupled position and a coupled position;
   said first and second thread means enabling operators to insert the first hose section between the second and the third hose sections while maintaining the preferred orientation of the second and third hose sections;
   said first coupling member constructed to a resilient and deformable material for enabling radial expansion of said first coupling member;
   means for inhibiting radial expansion of said second coupling members to enable radial expansion of said first coupling members within said coupling member to create a fluid tight seal therebetween;
   said first and second major thread means enabling rotation of the first hose section in one direction one-half said integral number of helical turns concomitantly with the rotation of the second hose section in an opposite direction one-half said integral number of helical turns to initially engage said first and second major thread means to enable relative rotation between said first and second major thread means for said integral number of helical turns to couple said first coupling member to said second coupling member and to return the second hose section to the preferred orientation and whereby the first hose and the second hose form and end-to-end seal internal the coupling when coupling together said first coupling member and said second coupling member, respectively; and
   said first and second major thread means enabling rotation of the first hose section in one direction one-half integral number of helical turns concomitantly with the rotation of the third hose section in an opposite direction one-half integral number of helical turns to initially engage said first and second thread means to enable relative rotation between said first and said second major thread means for said integral number of helical turns to couple said first coupling member to said second coupling member and to return the third hose section to the preferred orientation and whereby the first hose and the third hose form an end-to-end seal internal the coupling when coupling together said first coupling member and said second coupling member, respectively.

14. A coupling apparatus for coupling a first and a second hose to enable the flow of fluid therethrough upon the application of fluid pressure, comprising in combination:
   first coupling member having a first internal bore;
   means connecting the first hose internal said first coupling member;
   a second coupling member having a second internal bore;
   means connecting the second hose internal said second coupling member;
   first and second major thread means disposed on said first and second coupling member, respectively;
   said first coupling member being insertable into said second coupling member with said first major thread means threadably engaging said second major thread means whereby in use the first and second hose to form an end-to-end seal internal the coupling when coupling together said first coupling member and said second coupling member, respectively;
   said first coupling member constructed of a resilient and deformable material for enabling radial expansion of said first coupling member upon the application of the fluid pressure; and
   means for inhibiting radial expansion of said second coupling member to enable radial expansion of said first coupling member within said second coupling member to create a fluid tight seal therebetween.

15. A coupling apparatus as set forth in claim 14, wherein said first coupling member and said second coupling member have a first and a second end;
   said means connecting said first coupling member to the first hose being located on said first end of said first coupling member;
   said first major thread means being disposed on said second end of said first coupling member;
   said means connecting said second coupling member to the second hose located on said first end of said second coupling member; and
   said second major thread means being disposed on said second end of said second coupling member.

16. A coupling apparatus as set forth in claim 15, including first locking ring engaging means and second locking ring engaging means disposed on said first and said second coupling members, respectively;
   said first locking ring engaging means located proximate to said first end of said first coupling member;
   said second locking ring engaging means located proximate to said second end of said second coupling member; and
   locking ring means cooperating with said first and second locking ring engaging means to reasonably inhibit relative rotation of said first and said second coupling members.

17. A coupling apparatus as set forth in claim 16, wherein said means connecting said first coupling member to the first hose includes a first internal minor thread means extending into said first internal bore and located proximate said first end of said first coupling member for connecting said first coupling member to the first hose; and
   said means connecting said second coupling member to the second hose includes a second internal minor thread means extending into said second internal bore and located proximate said first end of said second coupling member for connecting said second coupling member to the second hose.

18. A coupling apparatus as set forth in claim 17, wherein said means connecting said first coupling member to the first hose includes a first plurality of through apertures and a third through aperture, said first plurality of through apertures disposed proximate said first end of said first coupling member and said third through aperture disposed on said first major thread means of said first coupling member;

said means connecting said second coupling member to the second hose includes a second plurality of through apertures and a fourth through aperture, said second plurality of through apertures disposed proximate said first end of said second coupling member and said fourth through aperture disposed proximate said second internal minor thread means;

said third and fourth through aperture providing means for inserting a flowable adhesive between said hoses and coupling members and into said first and second through apertures for bonding said flowable adhesive to the first and the second hoses.

19. A coupling apparatus as set forth in claim 18, wherein said inserted flowable adhesive cures within said first and second plurality of through apertures and bonds to the first and the second hoses thereby creating structural projections bonded to the first and the second hose; and said structural projections extending through said first and second plurality of through apertures of said first and second coupling members.

20. A coupling apparatus as set forth in claim 19, wherein said flowable adhesive bonds to the first and the second hoses and occupies voids located between said first and second coupling members and the first and the second hoses thereby creating first and second adhesive thread means for threadably engaging said first and second internal minor thread means, respectively.

21. A coupling apparatus as set forth in claim 20, wherein said second end of said first coupling member comprises an undercut portion disposed on said second end of said first coupling member; and said first major thread means being located on said undercut portion of said first coupling member.

22. A coupling apparatus as set forth in claim 21, wherein said second end of said second coupling member includes a third internal bore disposed on said second end of said second coupling member;

said second major thread means being located on said third internal bore; and said third internal bore of said second coupling member being established to receive said undercut portion of said first coupling member therein with said first major thread means threadably engaging said second major thread means.

23. A coupling apparatus as set forth in claim 22, wherein the first hose extends into said first coupling member proximate to said undercut portion of said first coupling member;

the second hose extending into said second coupling member proximate said second major thread means of said second coupling member enabling an end of the first hose to abut against an end of the second hose for forming said end to end side to prevent the flow of fluid from abrading said first and said second coupling members.

* * * * *

UNITED STATES PATENT AND TRADEMARK OFFICE
CERTIFICATE OF CORRECTION

PATENT NO. : 4,666,188
DATED : May 19, 1987
INVENTOR(S) : Wayne B. Hockett

It is certified that error appears in the above-identified patent and that said Letters Patent are hereby corrected as shown below:

In the Claims

Claim 1, column 9, line 16, after "second" insert --coupling--.
Claim 5, column 9, line 66, after "third" insert --through--.
Claim 13, column 11, line 20, delete "to" and insert therefor --of--.
Claim 23, column 14, line 26, delete "side" and insert therefor --seal--.

Signed and Sealed this

Fifteenth Day of September, 1987

Attest:

DONALD J. QUIGG

Attesting Officer     Commissioner of Patents and Trademarks